Dec. 1, 1964   M. J. CAPARONE ETAL   3,159,346
CONTROL VALVES FOR A DOMESTIC WATER HEATER
Original Filed Dec. 29, 1959   4 Sheets-Sheet 4

United States Patent Office 3,159,346
Patented Dec. 1, 1964

3,159,346
CONTROL VALVES FOR A DOMESTIC
WATER HEATER
Michael J. Caparone, Arcadia, and Theodore J. Dykzeul, Rolling Hills, Calif., assignors to Robertshaw Controls Company, a corporation of Delaware
Continuation of abandoned application Ser. No. 862,694, Dec. 29, 1959. This application Nov. 29, 1962, Ser. No. 243,968
17 Claims. (Cl. 236—33)

This invention relates to control devices for providing variable recovery rates for an appliance. More particularly, this invention relates to control devices for varying the input rate and the fuel pressure at a burner in response to the temperature of the medium heated by the burner as determined by the rate of draw-off of the medium.

This application is a continuation of copending application, Serial No. 862,694, filed December 29, 1959, now abandoned, and assigned to the same assignee.

Prior devices used to control the fuel flow to a burner for heating a water supply tank have controlled the fuel flow by manual and thermostatic operation. In these devices, a thermostat is situated in the water supply tank and intermittently operates a valve which controls the fuel flow to the burner, thus maintaining the water in the supply tank at a desired temperature.

However, during certain periods of the day when there is a large demand and a correspondingly large draw-off of water from the supply tank, the burner cannot restore the temperature of the water within the tank to the desired value with sufficient rapidity and the result is a drawoff of water at a temperature below that desired. To remedy this situation, it has been necessary to set the control point temperature of the thermostat at a higher value, usually by operation of a temperature adjustment knob provided externally of the controlled device. Subjecting the tank to high water temperatures greatly decreases the life of the tank.

Other prior art devices, in attempting to compensate for large irregular drawoffs, have disclosed a plurality of heaters, gas burners or electrical resistance elements, or a plurality of valves which are operated sequentially by a plurality of thermostats disposed at different positions in a water supply tank. Due to the multiplicity of parts in these devices, bulky and expensive controls have resulted.

An object of this invention is to effectively compensate for variations in demand by varying the fuel input rate to a burner.

Another object of this invention is to increase the life of the water supply tank by avoiding excessively high water and tank temperatures.

Still another object of this invention is to control the fuel flow rate through a valve casing in accordance with a temperature external to the casing.

Another object of this invention is to allow the fuel input rate to a hot water heater to be adjusted or controlled either manually or automatically in accordance with the rate of use of the hot water as indicated by a temperature change in the water.

A further object of this invention is to vary the fuel input rate to a burner by the throttling action of a thermostatically operated valve responsive to a temperature external to the valve casing.

In the preferred embodiment of this invention, a casing with a fluid flow passage having an inlet and an outlet is provided with a valve disposed therebetween which is operable in response to an external condition for controlling the rate of fluid flow to the outlet. Pressure regulating means is provided for controlling the pressure of the fluid flow through the passage of the casing. A resilient means is operatively connected to the controlling means and determines the pressure of fluid flow therethrough. The valve is operatively connected to an external means to regulate the fluid flow rate to the outlet of the casing in response to variations of an external condition.

These and other objects and advantages of this invention will become apparent from the following detailed description taken in connection with the accompanying drawings wherein.

Figure 1:
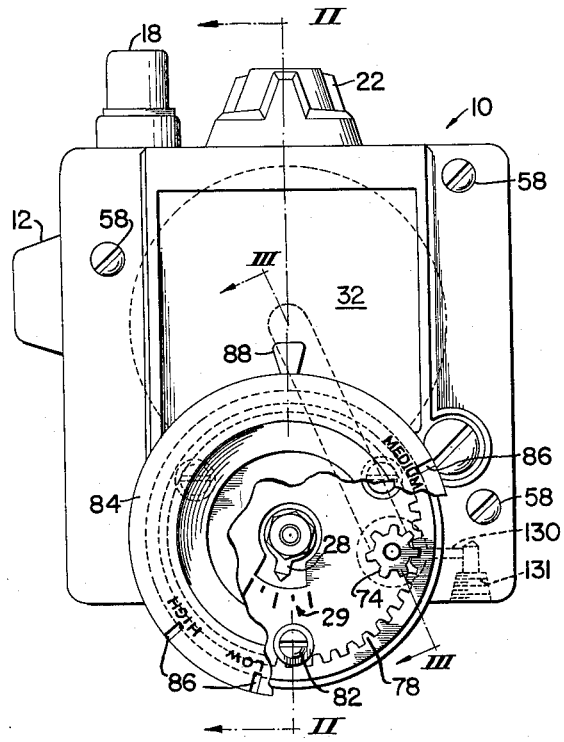
FIGURE 1 is a front elevation of the control device embodying this invention with the pressure control knob partially broken away.
Figure 2:
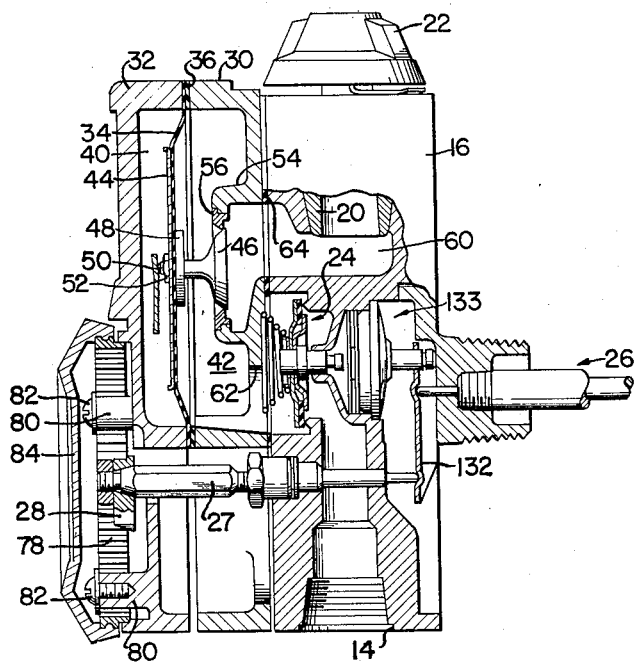
FIG. 2 is a partial sectional view taken on lines II—II of FIG. 1.
Figure 3:
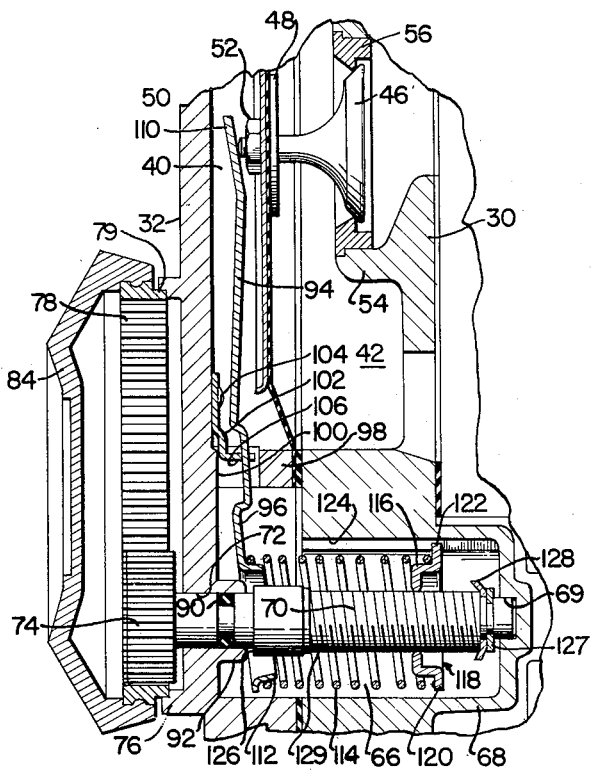
FIG. 3 is an enlarged sectional view taken on lines III—III of FIG. 1.

Referring more particularly to the embodiment of this invention shown in FIGS. 1-3, a fluid flow control device 10 is provided with an inlet 12 and an outlet 14 which are adapted to be connected to supply fuel to a domestic water heater burner or similar apparatus. The control device 10 comprises a basic casing 16 housing the control elements which include a conventional thermoelectrically operated safety valve (not shown) having a manual reset button 18, a gas cock 20, and a thermostatically operated valve 24. The gas cock 20 is provided with a dial 22 for manual operation thereof and contains appropriate openings for controlling fluid flow to the main burner of the water heater and also for controlling fluid flow to a pilot burner for the main burner. The thermostatically operated valve 24 is operable between open and closed positions in response to a predetermined temperature sensed by a rod and tube assembly 26 of a type well known in the art. A temperature adjustment means is provided for the thermostatically operated valve 24 and takes the form of a shaft 27 having an adjustment stop with a pointer 28 which is adapted to cooperate with temperature calibration markings 29 placed directly on the cover section 32.

Regulating means is provided for controlling the fluid flow between gas cock 20 and the thermostatically operated valve 24. To this end, a subassembly is provided comprising a valve seat section 30 and the cover section 32. A circular diaphragm 34 and a gasket 36 are disposed between the valve seat section 30 and the cover section 32 and a pair of screws (not shown) hold the sections together to compress the gasket and the circumferential edge of the diaphragm 34 to form a fluid-tight connection. The diaphragm 34 forms a partition between the valve seat section 30 and the cover section 32 to define a chamber 40 and a chamber 42 on either side of the diaphragm. The diaphragm 34 is of flexible material impermeable to gas. A circular diaphragm pan 44, having a smaller diameter than the diameter of the diaphragm 34, is mounted on one side of diaphragm 34.

A valve member 46 is provided with a circular shoulder 48 disposed on the stem thereof and a threaded portion 50 extends from the central portion of shoulder 48 through apertures disposed centrally in the diaphragm 34 and the diaphragm pan 44. A nut 52 is tightened on threaded portion 50 to fasten the valve member 46 to the diaphragm 34 in a fluid-tight manner. The valve seat section 30 is provided with a hollow boss 54 having a circular valve seat 56 press-fitted and staked into place. The valve seat 56 has a smaller diameter than valve 46 and is cooperable therewith to regulate fluid flow through the control 10.

The subassembly is connected to the basic casing 16 by screws 58 extending through the cover section 32 and the valve seat section 30 into the casing 16. This aligns the passage within boss 54 with a passage 60 leading from the open end of gas cock 20. It is now apparent that fluid flow from the gas cock 20 must flow past valve seat 56, chamber 42, and an opening 62 formed in the valve seat section 30 adjacent boss 54 before reaching the thermostatically operated valve 24 and subsequently outlet 14. A suitable gasket 64 is compressed between valve seat section 30 and the basic casing 16 to prevent external and internal leakage between the separate passageways.

As shown in FIG. 3, valve seat section 30 and cover section 32, when connected to the casing 16, define a substantially cylindrical smooth-walled adjustment chamber 66 located in the lower portion of the control device 10. A projecting portion 68 of the valve seat section 30 extends into a matching cavity in the basic casing 16. The projecting portion 68 is provided with a centrally disposed recess 69 and an adjusting screw 70 has one end journaled therein. The adjustment screw 70 extends along the longitudinal axis of chamber 66 and through a cylindrical aperture 72 formed in the cover section 32.

A pinion gear 74 for rotating the adjustment screw 70 is disposed externally of the cover section 32 and is secured to the outwardly extending end of adjustment screw 70 by any suitable means, such as a press-fit or a nut (not shown). An annular boss 76 is centrally positioned at the lower portion of cover section 32 and an annular internal gear 78 is provided with a peripheral bearing portion 79 engaging the inner wall of boss 76. The internal gear 78 is free to rotate relative to boss 76 and the internal teeth of the gear cooperatively engage the teeth of pinion gear 74. Suitably spaced bosses 80 extend outwardly from cover section 32 adjacent the teeth of internal gear 78. A screw 82 is threaded into each boss 80 and the head of each screw is sufficiently large to overlap the teeth of the internal gear 78 to rotatably mount the gear in place on boss 76.

A cup-shaped selector knob 84 is snap-fitted to the outer peripheral wall of internal gear 78. The selector knob 84 is provided with notches 86 and suitable indicia positioned thereon for cooperation with an indicator 88 disposed centrally of the front face of cover section 32 and adjacent the periphery of the selector knob 84 to indicate the position of the same.

An annular groove is located in the adjustment screw 70 and a sealing ring 90 is positioned therein for cooperation with an internal portion of an apertured boss 92 extending inwardly from the cover section 32. A lever 94 has a flanged semicircular slot in end 96, which slot is of sufficient width to clear the outer diameter of the apertured boss 92, and adjustment screw 70. A wall 98 of the cover section 32 is adapted to separate the chamber 40 from the adjustment chamber 66 and is provided with an opening 100 through which lever 94 extends. A substantially triangular-shaped member 102 is fastened to the cover section 32 by suitable means, such as a rivet 104, and is provided with an inwardly extending lip 106 having projections which are received in edge slots (not shown) in lever 94 and serve as a fulcrum therefor. The other end 110 of lever 94 engages the threaded projection portion 50 of valve member 46.

The slotted end 96 of lever 94 has an inturned flange 112 which internally mounts one end of a helical coil spring 114. The coil spring 114 is coaxial with adjustment screw 70 and has its other end internally mounted on a centrally recessed dome 116 of an annular member 118. The peripheral edge portion 120 of annular member 118 is provided with a projection forming a key 122 which extends into a keyway 124 formed in the wall of the adjustment chamber 66 and extends parallel to the longitudinal axis thereof. The adjustment screw 70 is threadedly received by the inner wall of the recessed dome 116 and is adapted to move the annular member 118 longitudinally when the adjustment screw 70 is rotated by manual rotation of selector knob 84.

An annular shoulder 126 is provided on the adjustment screw 70 and is adapted to engage boss 92. When the valve seat section 30 and the cover section 32 are assembled, the adjustment screw 70 is free to rotate but the end of the adjustment screw 70 cannot be retracted from the recess 69.

A stop member 128, formed as a cup-shaped washer, is held in place by a C-washer 127 crimped into an annular groove formed adjacent the end of the adjustment screw 70. Stop member 128 is adapted to engage the annular member 118 to prevent further extension of the coil spring 114. An imperfect thread 129, located adjacent the outer extremity of the threaded portion of the adjustment screw 70, is adapted to limit outward movement of the annular member 118 to prevent further compression of the coil spring 114.

The valve seat section 30, as shown in FIG. 1, is provided with a passageway 130 communicating with the innermost end of the adjustment chamber 66. Air is bled from chamber 40 through adjustment chamber 66 to passage 130 and subsequently out of the bleed connection 131 shown in dotted lines at the lower right corner of FIG. 1. An appropriately sized orifice is drilled in the valve seat section, or alternatively, a plug (not shown) with an appropriately sized orifice is fastened in the bleed connection 131.

During operation of the embodiment shown in FIGS. 1-3, gas flows from a suitable source through the inlet 12 and past thermoelectrically operated safety valve (not shown) to the gas cock 20. The gas cock 20 is manually operated by dial 22 to control gas flow to a pilot burner through appropriate passages (not shown) and to control gas flow through the end of gas cock 20 into passage 60. Gas flow from passage 60 is then regulated by valve 46 and proceeds through diaphragm chamber 42 and opening 62 to the thermostatically operated valve 24.

The thermostatically operated valve 24 is operable between open and closed positions by the rod and tube assembly 26 which is responsive to an external condition, such as a temperature of water in a tank, to control fluid flow through outlet 14 to the main burner (not shown) situated in heating relationship to the water tank. The temperature at which the valve 24 is operated is set by rotating pointer 28 relative to markings 29, both of which are concealed by the snap-on selector knob 84. Rotation of pointer 28 varies the position of shaft 27 and a lever 132 which is adapted to engage the rod and tube assembly 26. Expansion of the rod and tube assembly 26 is transmitted through the lever 132 to valve 24 by a clicker assembly 133 of a type well known in the art.

The diaphragm mounted valve 46 is reponsive to the difference in pressure between passage 60 and diaphragm chamber 42, to thereby regulate the pressure in the control device 10 in the conventional manner.

Air is bled from chamber 40 through adjustment chamber 66, passage 130, and bleed connection 131. The drilled orifice in the valve seat section 30 or the orifice plug (not shown) disposed in bleed connection 131 is used to retard the regulator response upon opening of the thermostatic valve 24 to prevent initial over-gasing of the main burner. This orifice also provides a dampening effect to prevent regulator vibration at low flows on low capacity burner applications.

Under normal hot water demand conditions, the "low" indicia on selector knob 84 is positioned adjacent indicator 88 and the coil spring 114 extends substantially the full length of adjustment chamber 66. Thus, only a small biasing force is transmitted by lever 94 to valve member 46 and there is relatively low pressure fluid flow through the valve 46 resulting in a relatively low input rate to the burner.

When there is a high demand for hot water, selector knob 84 is rotated in a clockwise direction through approximately 320° until the "high" indicia is adjacent indicator 88. This rotation of selector knob 84 causes movement of internal gear 78 therewith to rotate pinion gear 74 in a clockwise direction. Since pinion gear 74 is connected to adjustment screw 70, the adjustment screw will be rotated in clockwise direction to move the annular member 118 longitudinally toward the cover section 32, thereby compressing regulator spring 114. Key 122, disposed in keyway 124, prevents rotational movement of the annular member 118. As the regulating spring 114 is compressed, it exerts a force on end 96 to pivot lever 94 in a clockwise direction. End 110 of lever 94 exerts a force on threaded portion 50 to move the valve member 46 away from valve seat 56, thereby increasing the gas pressure.

The increased gas pressure and resultant increased burner input rate will cause increased recovery rate of the water heater to compensate for the high demand for hot water. By changing the input rate to the burner rather than the temperature setting, more effective compensation results and the water heater tank is subjected to a relatively lower maximum temperature which has the effect of increasing tank life.

It is apparent that selector knob 84 may be rotated to any position between the indicia "high" and the indicia "low" to provide a burner input rate corresponding to the hot water demand. By using an internal gear and pinion gear, a relatively low rate regulator spring can accomplish accurate regulation while still confining the required range of adjustment of selector knob 84 to less than 360°. The unused portion of the internal gear 78 between the "high" and "low" positions has the corresponding teeth of the internal gear in contact with the pinion gear either filled or solid to prevent an incorrect rotation of the selector knob 84 outside its calibrated range.

Figure 6:
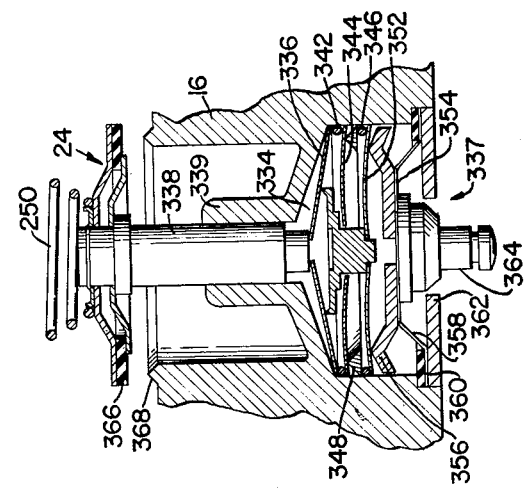
FIG. 6 is a sectional view of the thermostatic valve of FIG. 4 shown in the open position.
Figure 5:
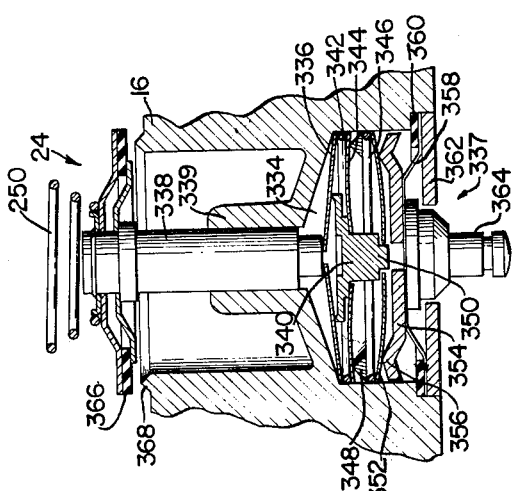
FIG. 5 is a sectional view of the thermostatic valve of FIG. 4 shown in throttling position.
Figure 4:
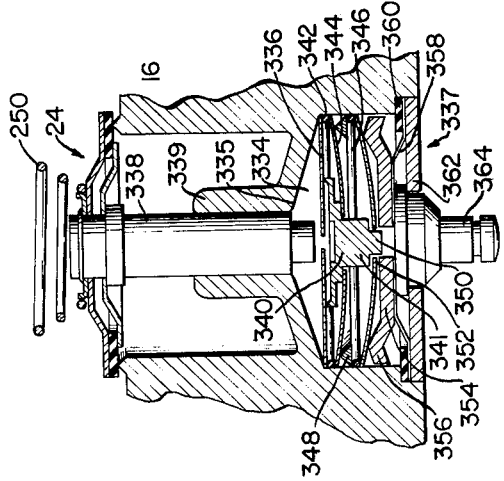
FIG. 4 is a sectional view of a thermostatic valve for the control device in the closed position.

The mechanism shown in FIGS. 4, 5, and 6 is used in place of clicker assembly 133 of FIGS. 1-3 to actuate thermostatically operated valve 24. The thermostatically operated valve 24 of FIGS. 4, 5, and 6 now has a variable valve lift which is operable in response to a temperature change sensed by the rod and tube assembly 26, shown in FIG. 2. The rod and tube assembly 26, of FIG. 2, actuates lever 132 to operate a thrust button 364 of FIGS. 4, 5, and 6.

FIGS. 4, 5, and 6 show an embodiment of a clicker assembly in which two clickers provide a variable valve lift. In effect, this variable thermostatic valve provides an initial throttling open action in response to the action of the low force clicker, after which a higher force clicker then fully opens the thermostatic valve to its maximum lift if there is further cooling of the rod and tube assembly 26.

Referring particularly to FIG. 4, the thermostatically operated valve 24 is in the closed position relative to valve seat 368 formed in basic casing 16. A suitable cylindrical cavity 334 having a conical end wall portion 335 is located in the casing 16 to accomodate the clicker assembly 337. Substantially radial fulcrum levers 336 within a peripheral ring are positioned at the junction of the sidewalls of cavity 334 and end wall portion 335 so as to pivot within cavity 334 when the clicker assembly 337 is actuated. Fulcrum levers 336 transmit longitudinal motion to the valve stem 338 positioned in valve guides 339 to actuate the thermostatically operated valve 24. The outer periphery of a circular fulcrum button 340, actuated by the clicker assembly 337, substantially intercepts the intermediate portion of fulcrum levers 336, so that movement of the fulcrum button 340 will transit a force to fulcrum levers 336.

A circular wire ring 342 acts as a peripheral fulcrum to further position the fulcrum levers 336 so that they will be pivoted about the junction of the end wall and the sidewall of the cavity 334. A lower force disc clicker 344, having a circular aperture in the central portion thereof to accommodate the stem 341 of the fulcrum button 340, is actuated by a ring fulcrum 348. Ring fulcrum 348 is in turn actuated by circular wire ring 346. It is to be noted that the uppermost portion of the peripheral fulcrum projections of ring fulcrum 348 engages the bottom surface of the lower force disc clicker 344 at a point adjacent to its outer periphery, but spaced inwardly a distance which is greater than the diameter of the circular wire ring 342. The lowermost portion of the fulcrum buttom 340 has a stem portion 350 which extends through the center portion of higher force disc clicker 352. A disc-shaped fulcrum plunger 354, having an upwardly extending arcuately bent peripheral portion 356, engages the lower surface of higher force disc clicker 352. The center portion of the fulcrum plunger 354 has an aperture therein, which aperture prevents the fulcrum plunger 354 from directly engaging and actuating the fulcrum button 340. The fulcrum plunger 354 acts as an inner fulcrum ring for the higher force disc clicker 352.

A gas-tight flexible membrane 358 seals and positions a flexible sealing disc 360 within a groove located in the body of the casing 16. A friction washer 362 retains thrust button 364 in engagement with the flexible membrane 358. The thrust button 364 is actuated by a lever, such as lever 132 in FIG. 2, in response to changes in the the internal temperature of the material to be sensed.

In operation, as shown in FIG. 5, the thrust button 364 is actuated when an initial demand for heat is sensed by rod and tube assembly 26 (not shown). Thrust button 364 exerts a force on flexible membrane 358, which force is transmitted to fulcrum plunger 354. As a higher force is required to snap clicker 352 overcenter than is required for clicker 344, clicker 352 transmits the motion of fulcrum plunger 354 to circular wire ring 346. Circular wire ring 346 transmits the force to ring fulcrum 348 which in turn exerts a force on the lower surface of clicker 344 to pivot clicker 344 to the over center position using circular wire ring 342 as a fulcrum. Clicker 344, is snapping to the overcenter position, exerts a force on the lower surface of fulcrum button 340, which actuates the buttom in an upward direction. The periphery of fulcrum button 340 engages this lower surface of fulcrum levers 336 to pivot levers 336 into engagement with the bottom surface of valve stem 338. The pivotal movement of fulcrum levers 336 exerts a force sufficient to overcome the biasing force of conical spring 250. The valve face 366 is displaced relative to the valve seat 368 a relatively short distance to initially open the thermostatically operated valve 24.

As shown in FIG. 6, upon further cooling of the water within the hot water tank, the rod and tube asembly 26 (not shown) will exert an additional force on thrust button 364 which causes further upward movement of the fulcrum plunger 354.

Peripheral fulcrum projection 356 of fulcrum plunger 354 will exert the additional force and movement on higher force disc clicker 352 to actuate clicker 352 to the overcenter position. The central portion of disc clicker 352, accommodating lowermost projection 350 of fulcrum button 340, transmits the upward motion of the overcenter position to fulcrum button 340. Further actuation of fulcrum button 340 in the upward direction exerts an additional force to further pivot fulcrum levers 336 already engaging valve stem 338. Value stem 338 is thereby further displaced upwardly to obtain maximum valve lift between valve face 366 and valve seat 368.

As the demand is satisfied, the thrust button 364 is biased downwardly as both the lower force disc clicker 344 and the higher force disc clicker 352 are normally biased in their configurations as shown in FIG. 19. In this manner, the thermostatically operated valve 24 has more than one position for throttling the gas flow therethrough, which positions are directly dependent upon the change of water temperature within the water heater and the design factors of clickers 344 and 352 for a particular application.

Interchange in position of the higher force to snap disc clicker 352 and the lower force to snap disc clicker 344 can be made in this mechanism to achieve essentially the same operation for opening and closing the thermostatically operated valve 24. It is also possible through the correct selection of clicker return forces, where the higher force to snap disc clicker 352 has a lower return force than the return force of the lower force to snap disc clicker 344, to secure a snap-throttle-snap opening and an essentially snap closing of the thermostatically operated valve 24.

With a regulater gas pressure to the thermostatically operated valve 24, the valve action described in connection with FIGS. 4, 5, and 6 provides an automatic variable recovery rate responsive to heat demand, thereby increasing the recovery rate during a period of high heat demand and decreasing the recovery rate during a period of a relatively low heat demand. It is to be noted that the application of this valving device is not limited to water heater application but is also applicable to other applications, such as space heating and oven temperature control.

Figure 9:
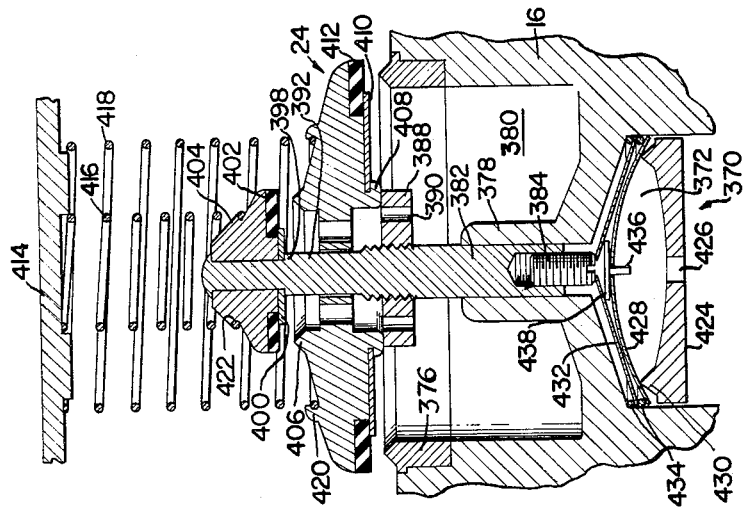
FIG. 9 is a sectional view of the thermostatic valve of FIG. 7 with both valve members in open position.
Figure 8:
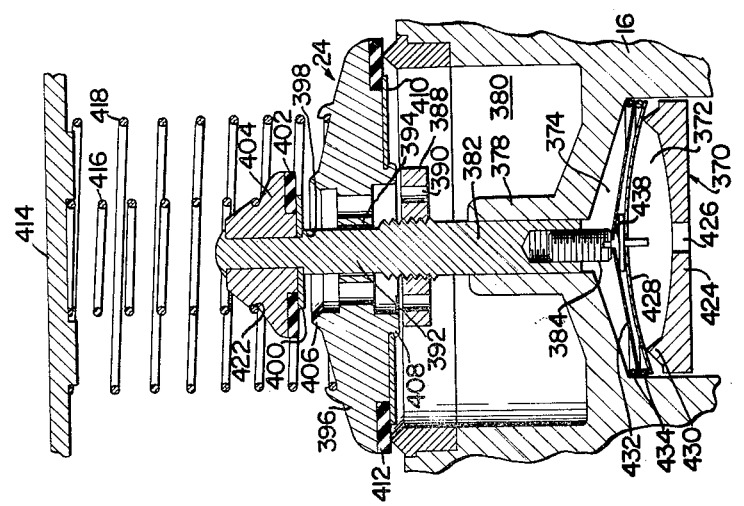
FIG. 8 is a sectional view of the thermostatic valve of FIG. 7 with one valve member in the open position.
Figure 7:
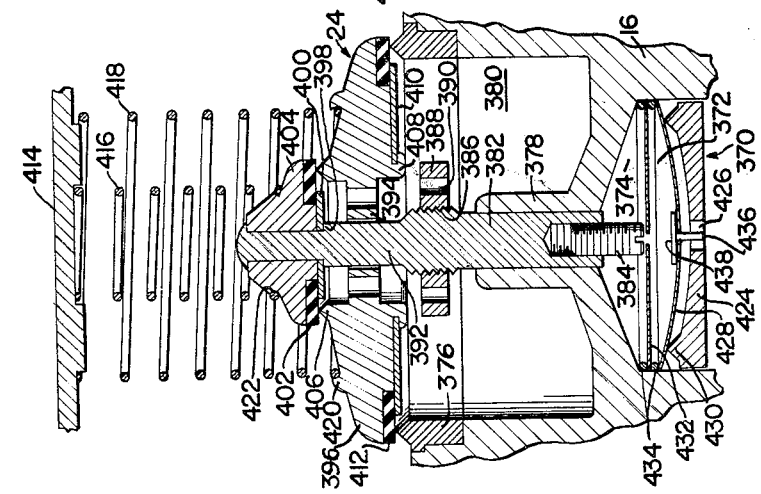
FIG. 7 is a sectional view of a thermostatic valve for the control device which has two concentric valve members.

Referring to FIGS. 7, 8, and 9, there is shown another embodiment of a valve lift mechanism in which the thermostatically operated valve 24 of FIGS. 1–3 is adapted to utilize two concentric thermostatic valves to obtain a variable recovery rate.

In FIG. 7, the clicker mechanism 370 is located in a cavity 372 having a tapered cone-shaped end 374 bored onto the casing 16. An insert supplemental valve seat 376 is press-fitted into the periphery of chamber passage 380 located in the opposite wall of casing 16. Insert valve seat 376 is positioned concentric with the clicker mechanism 370. A cylindrical valve guide 378 is centrally located in passage 380 and is formed integrally from the casing 16. Valve stem 382 extends through the valve guide 378 and has a length adjustment screw 384 threaded into the lower end of the valve stem. An externally threaded portion 386 of the valve stem 382 has an adjusting nut 388 threadedly engaged thereon which contains passage openings 390. A reduced diameter section 392 on valve stem 382 passes freely through a valve guide section 394 of the large or supplemental valve 396. An annular shoulder 398 on valve stem 382 has a small valve face retainer 400, valve face 402 and small or main valve 404 located and staked in place by staking the top of the valve stem 382.

The large valve 396 has an annular portion forming main valve seat 406 for the small valve 404. The lower inner section of the large valve 396 is staked at 408 to hold a valve face retainer 410 and valve face 412 in place on the large valve 396.

For purposes of describing this embodiment of the thermostatically operated valve, a valve cover plate is indicated at 414 but it will readily be understood that a valve cover plate could be adapted from the several embodiments previously described wherein valve seat section 30 of FIGS. 1–3 would most nearly correspond to a valve cover plate. Two helical valve springs 416 and 418, respectively, act in compression between the valve cover plate 414 and the valves 404 and 396. Valve spring 418 acts on the large valve 396 and is positioned thereto by an annular rib 420 acting as a spring retainer. Valve spring 416 acts on the small valve 404 which has an annular groove 422 for spring retention.

The clicker mechanism 370, as shown in FIG. 22, has a ring fulcrum 424 located across the open end of cavity 372 with an aperture 426 located in the center thereof. A clicker disc 428 is located concentrically with the ring fulcrum 424 and engages the annular projections 430 of the ring fulcrum 424. Fulcrum levers or amplifying means 432 extend inwardly from the sides of the cavity 372 and are positioned therein by annular wire rings 434 so that the fulcrum levers will be in operative relation with the clicker disc 428. A thrust button 436 extends through an aperture in the clicker disc 428 and has a stem thereon which is of sufficient length so that the thrust button cannot be removed from the clicker disc. An actuating force directly responsive to the temperature of the hot water tank will actuate the ring fulcrum 424 in a longitudinal direction relative to valve stem 382.

During operation, as shown in FIG. 8, the hot water tank has cooled to a point where sufficient force has been developed to actuate ring fulcrum 424 in an upward direction so as to cause clicker disc 428 to snap overcenter, thereby engaging thrust button 436 with fulcrum levers 432. As head 438 of thrust button 436 is designed to have a relatively large diameter, the peripheral edge of head 438 will engage fulcrum levers 432 to pivot them in an upward direction so as to engage the bottom surface of the length adjustment screw 384 of the valve stem 382.

The resulting movement of the valve stem 382 in an upward direction lifts the valve face 402 of the small valve 404 from the valve seat 406, thereby opening the valve against gas pressure and the force of valve spring 416. As previously stated, the reduced diameter section 392 of valve stem 382 freely passes through the valve guide section 394 of the large valve 396. The adjusting nut 388, having a plurality of passages 390, will be positioned just short of contact with the bottom surface of the large valve 398 on the projection portion forming staking 408. Gas flow now takes place through small valve 404, valve guide section 394 and passage openings 390 of the adjusting nut 388.

In case of a high rate demand for hot water, resulting in further cooling of the water, the element actuating the ring fulcrum 424 will increase the force transmitted to the clicker disc 428 causing further upward movement of the valve stem 382. As the adjusting nut 388 engages the bottom surface of the large valve 396, further movement of the valve stem 382 results in the throttling open of the large valve 396 against the combined forces of valve springs 416 and 418 so as to position the valve face 412 from the valve seat 376, as shown in FIG. 9.

The further cooling of the water in the hot water tank, as a result of a high demand rate for hot water, thereby results in an increased input to the burner, as gas is now free to flow through both concentric valves 396 and 404. An automatic increased recovery rate is thereby secured in response to an increased demand for hot water.

As the water in the hot water tank approaches the desired temperature, the force on the ring fulcrum 424 is reversed, thus throttling closed the large valve 396 after which, on complete satisfaction on the thermostat setting, the small valve 404 is closed, thereby providing a complete shutoff. It will be noted that due to the differences in the peripheral length of each valve seat, the large valve 396 is capable of allowing a higher gas flow than the small valve 404. The step-down closing secured by this concentric thermostatic valve shown in FIGS. 7–9 prevents overshooting the temperature setting as the input and recovery rate of the hot water is reduced as the water approaches the temperature setting.

Although the foregoing description has been described with reference to the control of a system utilizing a liquid type medium having a supply tank, it will be apparent that modifications can be made to adapt the structure to the control of space heating and central heating units employing either a liquid or gaseous heating medium. Variations in structure, as well as operation, can be effected without departing from the scope of this invention as defined by the following claims.

While the form of the invention now preferred has been disclosed as required by the statutes, other forms may be used, all coming within the scope of the claims which follow.

What is claimed is:

1. A control device for controlling the burner means of a domestic water heater tank or the like for a household comprising a housing having an inlet adapted to be interconnected to a source of fuel and having an outlet adapted to be interconnected to said burner means, said housing having a passage interconnecting said inlet with said outlet, means to select the desired temperature of said water, and valve means disposed in said passage, said valve means including a supplemental valve seat disposed in said passage and interconnecting said inlet with said outlet, a supplemental valve member cooperable with said supplemental valve seat, said supplemental valve member carrying a main valve seat interconnecting said inlet with said outlet, a main valve member cooperable with said main valve seat and movable from a closed position to an open position to determine a main flow of fuel to said outlet during normal use of said water heater tank to provide a normal recovery rate for said water heater tank such as during average hot water draws for basin and shower use of the household so that sufficient hot water can be supplied at said selected temperature, said main valve member when in the closed position thereof preventing the flow of fuel from said inlet to said outlet, said supplemental valve member being movable from a closed position to an open position to control a supplemental flow of fuel to said outlet to add to said main flow of fuel during abnormal use of said water heater tank without affecting the normal regulation of said main valve member and without increasing the temperature of the water above the normal selected temperature thereof to provide an increased recovery rate for said water heater tank such as during hot water draws for laundry machine use of the household so that sufficient hot water can be supplied at said selected temperature, and a snap action member which controls movement of said main valve member and said supplemental valve member through flexure of said snap action member, said snap action member when flexed and snapped over center in one direction only opening said main valve member, said snap action member when further flexed in said one direction opening said supplemental valve member.

2. A control device as set forth in claim 1 wherein said snap-action member is flexed in said one direction by a thermostat means responsive to the temperature of the water in said water heater tank.

3. A control device as set forth in claim 1 wherein means are provided to amplify further flexure of said snap-action member in said one direction to amplify movement of said supplemental valve member.

4. In combination, a housing having a passage means leading from an inlet to an outlet, a supplemental valve seat disposed in said passage means and interconnecting said inlet with said outlet, a supplemental valve member cooperable with said supplemental valve seat said supplemental valve member carrying a main valve seat interconnecting said inlet with said outlet, a main valve member cooperable with said main valve seat, and a snap-action member for controlling opening movement of said valve members, said snap-action member when flexed and snapped over center in one direction only opening said main valve member, said snap-action member when further flexed in said one direction opening said supplemental valve member.

5. A combination as set forth in claim 4 wherein separate spring means respectively tend to maintain said valve members in the closed positions thereof.

6. A combination as set forth in claim 4 wherein a pair of concentrically disposed springs respectively engage said housing and said valve members to tend to maintain said valve members in the closed positions thereof.

7. A combination as set forth in claim 4 wherein a plurality of apertures pass through said supplemental valve member and are disposed inside said supplemental valve seat.

8. A combination as set forth in claim 4 wherein means are provided to selectively vary the amount of further flexure that said snap-action member must make before said supplemental valve member moves away from said supplemental valve seat.

9. A combination as set forth in claim 8 wherein said last-named means is carried by one of said valve members.

10. In combination, a housing having a passage means leading from an inlet to an outlet, a supplemental valve seat disposed in said passage means and interconnecting said inlet with said outlet, a supplemental valve member cooperable with said supplemental valve seat, said supplemental valve member carrying a main valve seat interconnecting said inlet with said outlet, a main valve member cooperable with said main valve seat, a snap-action disc construction for controlling opening movement of said valve members, said snap-action disc construction when flexed and snapped over center in one direction only opening said main valve member, said snap-action disc construction when further flexed in said one direction opening said supplemental valve member, means adjacent the outer periphery of said snap-action disc construction to prevent movement of said outer periphery in said one direction, and a movable plunger engagable with said snap-action disc construction for flexing said snap-action disc construction in said one direction when said plunger is moved in said one direction.

11. A combination as set forth in claim 10 wherein said plunger has an annular surface that contacts said snap-action disc construction adjacent the outer periphery thereof.

12. In combination, a housing having a passage means leading from an inlet to an outlet, a supplemental valve seat disposed in said passage means and interconnecting said inlet with said outlet, a supplemental valve member cooperable with said supplemental valve seat, said supplemental valve member carrying a main valve seat interconnecting said inlet with said outlet, a main valve member cooperable with said main valve seat, a snap-action member for controlling opening movement of said valve members, said snap-action member when flexed and snapped over center in one direction only opening said main valve member, said snap-action member when further flexed in said one direction opening said supplemental valve member, and amplifying means to amplify said further flexure of said supplemental valve member in said one direction.

13. A combination as set forth in claim 12 wherein said amplifying means is disposed between said snap-action member and said supplemental valve member.

14. A combination as set forth in claim 12 wherein said amplifying means comprises a fulcrum means.

15. In combination, a housing having a passage means leading from an inlet to an outlet, a supplemental valve seat disposed in said passage means and interconnecting said inlet with said outlet, a supplemental valve member cooperable with said supplemental valve seat, said supplemental valve member carrying a main valve seat interconnecting said inlet with said outlet, a main valve member cooperable with said main valve seat, a snap-action disc construction for controlling opening movement of said valve members, said snap-action disc construction when flexed and snapped over center in one direction only opening said main valve member, said snap-action disc construction when further flexed in said one direction opening said supplemental valve member, means adjacent the outer periphery of said snap-action disc construction to prevent movement of said outer periphery in said one direction, a movable plunger engageable with said snap-action disc construction for flexing said snap-action disc construction in said one direction when said plunger is moved in said one direction, and an amplifying construction between said snap-action disc construction and said supplemental valve member to amplify further movement of said snap-action disc construction in said one direction to said supplemental valve member.

16. A combination as set forth in claim 15 wherein said amplifying construction comprises a pair of opposed lever arms interconnected together at the outer ends thereof.

17. A combination as set forth in claim 16 wherein a motion transmitting member is disposed between said snap-action disc construction and said lever arms.

References Cited in the file of this patent

UNITED STATES PATENTS

| | | |
|---|---|---|
| 1,237,403 | Stack | Aug. 21, 1917 |
| 2,004,597 | Birtch | June 11, 1935 |
| 2,228,198 | Cerny | Jan. 7, 1941 |
| 2,303,700 | Mantz | Dec. 1, 1942 |
| 2,702,052 | Grayson | Feb. 15, 1955 |
| 2,743,870 | Drow | May 1, 1956 |
| 2,767,923 | Matthews | Oct. 23, 1956 |
| 2,784,913 | Wasson | Mar. 12, 1957 |
| 2,831,504 | Coffey | Apr. 22, 1958 |
| 2,889,990 | Loveland et al. | June 9, 1959 |
| 3,032,063 | Wells | May 1, 1962 |
| 3,052,264 | Graham et al. | Sept. 4, 1962 |

EDWARD J. MICHAEL, *Primary Examiner.*

PERCY L. PATRICK, MEYER PERLIN, *Examiners.*